Aug. 10, 1948.   E. WENK, JR   2,446,566
MODEL TESTING APPARATUS
Filed Jan. 22, 1946
3 Sheets—Sheet 1
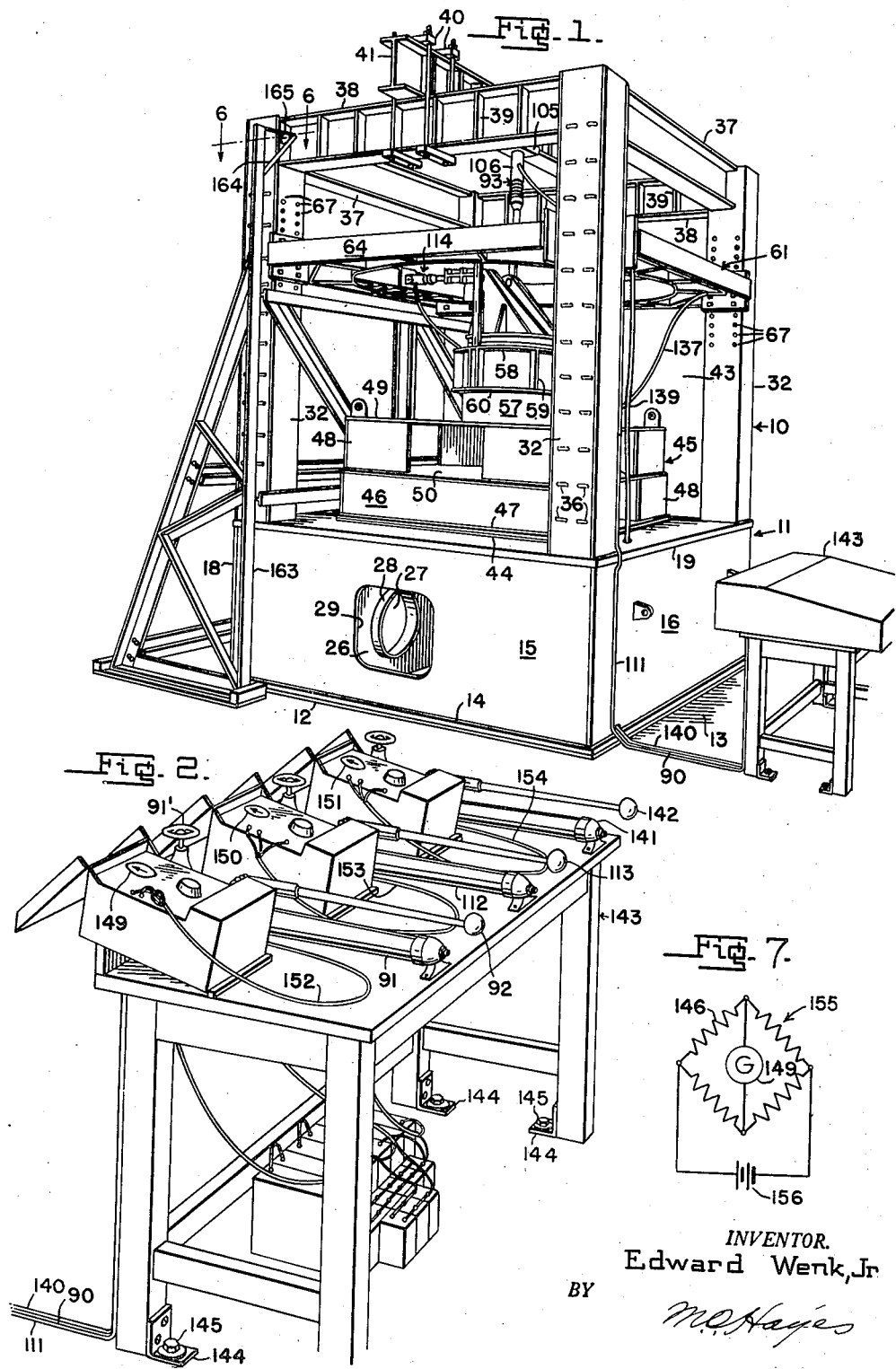
INVENTOR.
Edward Wenk, Jr.
BY
M. C. Hayes
ATTORNEY.

Aug. 10, 1948.    E. WENK, JR    2,446,566
MODEL TESTING APPARATUS
Filed Jan. 22, 1946    3 Sheets-Sheet 2
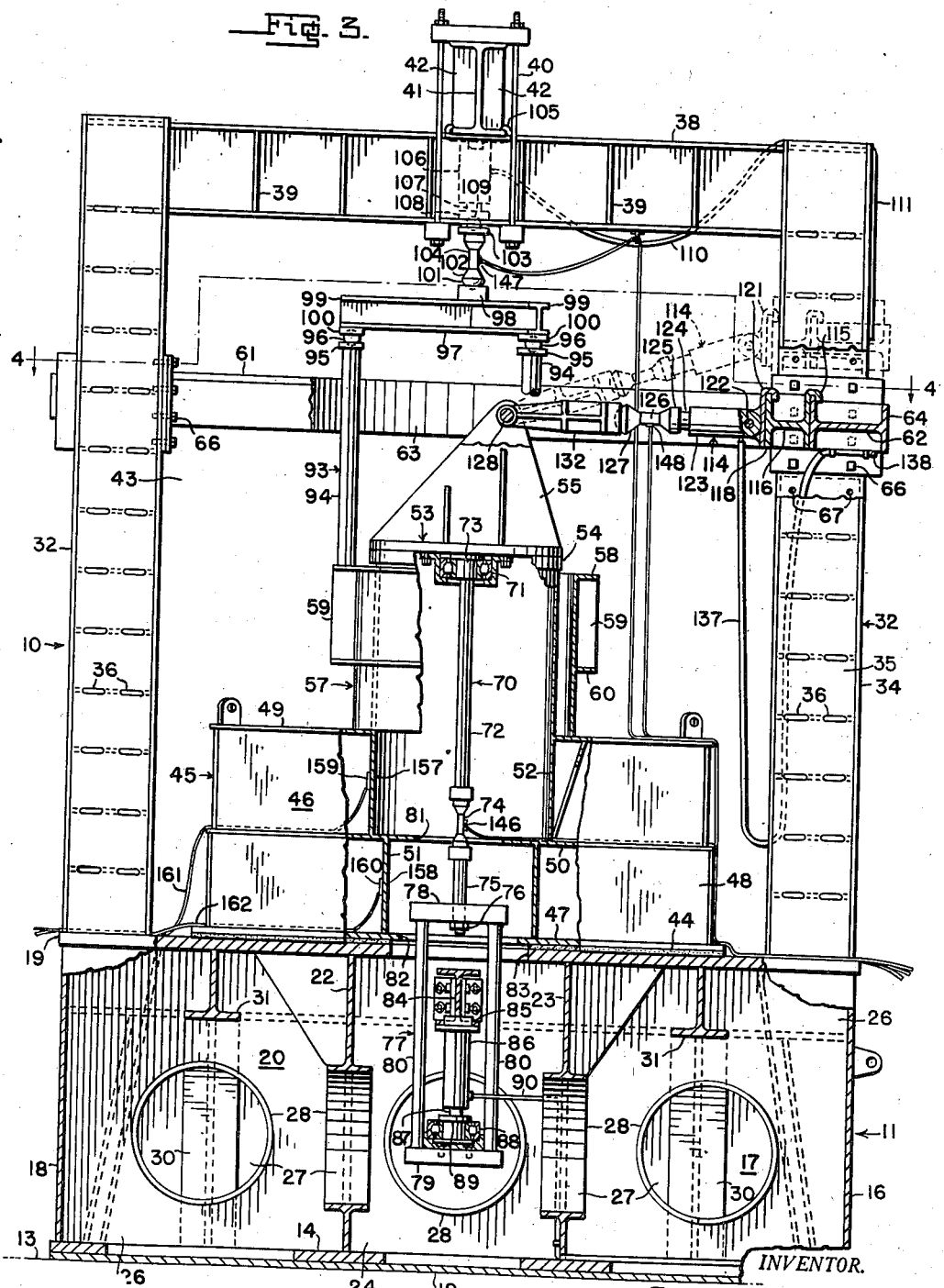
INVENTOR.
Edward Wenk, Jr.
BY
M. C. Hayes
ATTORNEY.

Aug. 10, 1948.          E. WENK, JR          2,446,566
MODEL TESTING APPARATUS
Filed Jan. 22, 1946                         3 Sheets-Sheet 3
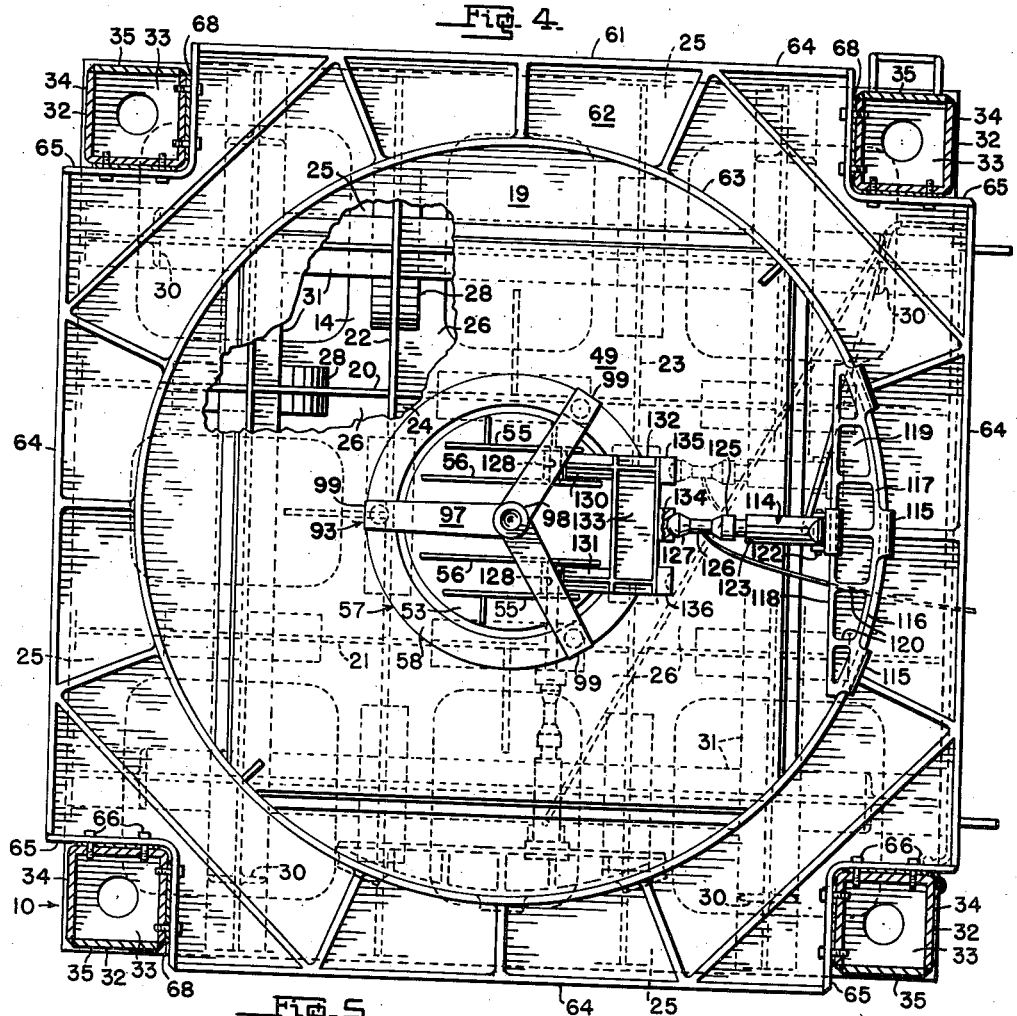
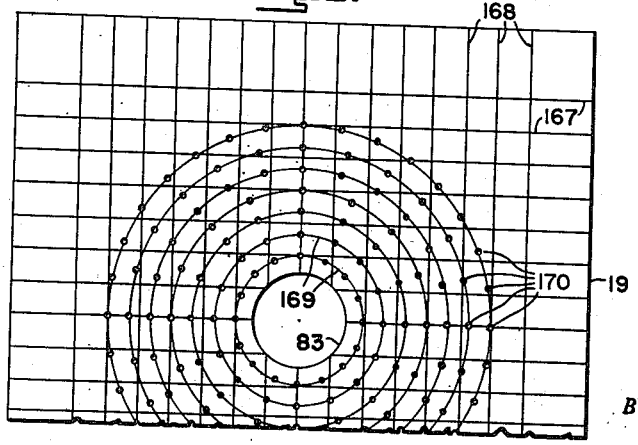
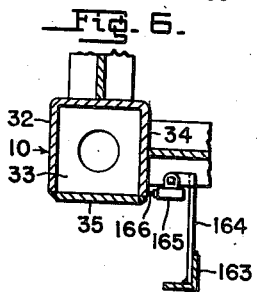
INVENTOR.
Edward Wenk, Jr.
BY
ATTORNEY.

Patented Aug. 10, 1948

2,446,566

UNITED STATES PATENT OFFICE 2,446,566

MODEL TESTING APPARATUS

Edward Wenk, Jr., Cabin John, Md.

Application January 22, 1946, Serial No. 642,778

9 Claims. (Cl. 73—88)

(Granted under the act of March 3, 1883, as amended April 30, 1928; 370 O. G. 757)

The invention relates to improvements in testing apparatus and more specifically to a loading frame for testing of structural assemblies, such as models of gun turrets, that are subjected during service to static and dynamic loads.

Static stresses in an exactly proportioned scale model of a structural assembly are the same as static stresses in the assembly itself if the loads applied at corresponding points are in the ratio of the square of the scale, provided first, that the model and prototype are of the same material, and second, that the dead weights of the structures are small in comparison with the applied loads. Otherwise, since the weight of the scale model is to the weight of the prototype as the ratio of their respective volumes, or as the cube of the scale, the dead loads in the model will be too small.

In testing structural models for determination of stress distribution, deformations, and load carrying capacity, it may be desirable for economic reasons to use incomplete models which omit certain portions of the prototype structure or equipment normally associated therewith. For instance, in testing turrets, it may be quicker and cheaper to use turret models which omit the guns and armor normally carried by the prototype, especially where armor of various thicknesses and different numbers or kinds of guns may be selectively employed on the prototype structure.

An important object of the invention is to provide, in apparatus for testing scale models of structural assemblies, load applying equipment for producing the conditions for similitude with static models having insufficient dead weight.

Another important object of the invention is to provide, in apparatus for testing incomplete models of structural assemblies, loading means adapted to compensate for the dead weight of those portions of the prototype structure which have been omitted from the model.

A further object of the invention is the provision of a testing frame for subjecting a model of a structural assembly to loads simulating those which might be applied to the prototype during use.

Another object of the invention is to provide testing apparatus which, unlike conventional testing machines, provides for the multidirectional application of loads at a plurality of spots on a three-dimensional structural model.

Yet another object is the provision, in apparatus for testing a gun turret model, of means for applying vertical loads to the barbette and rotary structure of the turret model to represent the weight of the guns and armor normally carried by the turret.

A still further object is to provide, in apparatus of the character described, for the application of a horizontal or inclined load to the rotary carriage to simulate the effect of recoil of one or more guns at any angle of elevation and train.

Other objects and advantages of the invention will become apparent during the course of the following detailed description, taken in connection with the accompanying drawings, forming a part of this specification, and in which drawings, Figure 1 is a fragmentary perspective view of the loading frame and showing a turret model supported therewithin.

Figure 2 is a fragmentary perspective view of load applying and measuring equipment preferably forming a part of the invention.

Figure 3 is a fragmentary view, partly in front elevation and partly in central vertical section, of the loading frame and turret model shown in Figure 1.

Figure 4 is a horizontal sectional view of the loading frame, substantially on the line 4—4 of Figure 3.

Figure 5 is a fragmentary top plan view of a structural model supporting plate which may form a part of the loading frame.

Figure 6 is a fragmentary horizontal sectional detail view substantially on the line 6—6 of Figure 1, and showing a loading frame deflection gage preferably forming a part of the apparatus.

Figure 7 is a diagrammatic view of a strain measuring circuit which may form a part of the invention.

In the drawings, which for the purpose of illustration show only a preferred embodiment of the loading frame, and wherein similar reference characters denote corresponding parts throughout the several views, the numeral 10 generally designates the loading frame, preferably formed of steel, and including a hollow, rigid, rectangular box-like base weldment 11, mounted on a wooden pad 12 resting on a floor surface 13.

In the example shown, the base 11 includes a bottom plate 14, side plates 15—18, and a top plate 19. Internally of the base, two longitudinal vertical symmetrical reinforcing walls 20, 21, and two transverse vertical symmetrical reinforcing walls 22, 23 define a central compartment 24, four corner compartments 25, and four side compartments 26. Formed in the walls 20—23 are circular access openings 27 defined by cylindrical reinforcing flanges 28 and permitting passage between adjacent compartments 24—26. The side plate 15 is provided with an access opening 29 permitting access to one of the side compartments 26. Supported at their ends as by uprights 30 are four beams 31 of inverted T-shape in cross section, and disposed subjacent the top plate 19 for additional support thereof.

Rigidly fixed to and extending upwardly from the corners of the base 11 are four hollow rectangular columns 32, each reinforced by a series of longitudinally spaced plates 33. These columns 32 may each include a channel member 34 within which the reinforcing plates are welded, and a web member 35 welded to the open side of the channel member. In each web member 35, slots 36 may be formed to facilitate welding of the reinforcing plates thereto.

Rigidly fixed to and extending horizontally between the upper end portions of adjacent columns 32 are I-beams 37, 38 forming a rigid rectangular frame. The opposite beams 38 are provided on both sides with longitudinally spaced reinforcing flanges 39. Spanning the beams 38 and adjustably secured thereto, as by yokes 40, is a transverse I-beam 41 provided on opposite sides with longitudinally spaced reinforcing flanges 42. It will be noted that the vertical columns 32 and horizontal beams 37, 38 define a cuboid testing space 43 over the base 11.

Supported on the top plate 19, as by a layer of cement 44, is a turret model 45 constituting the structure to be tested. In the example shown, the turret model includes a foundation portion 46, comprising a rectangular base plate 47, upright side walls 48, a deck 49, and an intermediate plate 50 between the deck 49 and the base plate 47. Centrally of the foundation portion a cylindrical wall 51 extends between the base plate 47 and intermediate plate 50. Extending vertically upwardly of the plate 50 is another cylindrical wall 52 terminating above the deck 49 and supporting at its upper end, a rotary gun carriage 53 as by a suitable roller track 54. In the example shown, two pairs of gun girders 55, 56 are symmetrically mounted on the rotary carriage 53, to represent a two-gun turret model. Mounted on the deck 49 and concentrically encircling the cylindrical wall 52 is a cylindrical barbette 57 terminating at its upper end in an annular external flange 58. Disposed below the flange 58 is a plurality of vertical stiffener flanges 59 terminating at their lower ends in an annular flange 60.

Surrounding the turret model 45 in the cuboid testing space 43 is a circular beam or girder 61 including a web 62, an internal cylindrical flange 63, four external rectangularly-disposed flanges 64, and reentrant corner flanges 65. Vertically adjustably fixing the circular beam within the box columns 32 are bolts 66 extending through the corner flanges 65 and engaging the columns at selected screw-threaded openings 67. Shims 68 may be fitted between the corner flanges 65 and the columns 32 as shown.

To simulate the weight of heavy guns and armor normally supported by a gun carriage in service, means 70 is provided for applying a vertical downward load to the rotary carriage 53. Centrally secured to the bottom surface of the carriage is a combined radial and thrust bearing 71 supporting a depending shaft 72 at its flanged upper end portion 73. The bearing 71 may be of the type provided with rollers having convexly curved sides permitting some axial misalignment of the shaft, as disclosed in Patent 54,156 granted to Hickok. Interposed in the shaft 72 is a reduced section 74, the purpose of which will be subsequently described. Attached to the lower end 75 of the shaft, as by a nut 76, is a depending yoke 77 comprising upper and lower bars 78, 79, and symmetrically spaced vertical connecting rods 80. The shaft 72 passes downwardly through a suitable opening 81 in the intermediate plate 50 of the turret model, and the yoke extends through openings 82, 83, in the base plate 47 of the model and the top plate 19 of the testing frame base 11, respectively. Rigidly fixed within the testing frame base is a transverse beam 84 horizontally extending through the yoke 77 and recessed at its lower side 85 to receive the cylinder 86 of a hydraulic jack having a downwardly directed piston 87. Mounted on the lower bar 79 of the yoke is a bearing 88, similar to the bearing 71, and receiving the flanged lower end portion 89 of the piston 87. Connected to the hydraulic jack by a pipe 90 is a hydraulic pump 91 operable by a hand lever 92 to produce any desired hydraulic pressure in the cylinder 86. The pressure produced by the hand pump 91 is of course maintained in the system as long as desired, as by a valve 91'.

In order to simulate various weights of armor such as might be used in a barbette, means 93 is provided for applying various downward vertical loads on the model barbette 57. Rigidly fixed on the annular flange 58 of the barbette are three equidistantly spaced vertical columns 94 of equal length and terminating at their upper ends in blocks 95 recessed for the mounting of spherical bearings 96 thereon. Disposed above the columns is a rigid spider 97 having an upwardly facing recessed block 98 at its central position and three radial arms 99 provided with downwardly facing recessed blocks 100 resting on the spherical bearings 96. Mounted on the upwardly facing recessed block 98 is the lower spherical end 101 of a rod 102 terminating at its upper end in an upwardly facing recessed block 103. The rod 102 is provided with a reduced section 104, the purpose of which will be subsequently described. Attached to the lower web of the transverse beam 41, as by a channel-shaped bracket 105, is the cylinder 106 of a hydraulic jack having a vertically reciprocable plunger 107 terminating at its lower end in a downwardly facing recessed block 108. Interposed between the blocks 103, 108 is a spherical bearing 109 similar to the bearings 96. Communicating with the hydraulic cylinder 106 is a flexible pipe 110 provided with a rigid extension 111 which is connected to a hydraulic pump 112 provided with a hand lever 113 for producing any desired pressure in the hydraulic cylinder 106.

Adjustable means 114 is provided for applying a lateral or inclined load to the rotary carriage from any radial direction to represent the effect on the carriage of the recoil of one or more guns at various angles of elevation and train. Supported by the circular beam 61 for adjustment circumferentially thereof, as by hooks 115 engaging the cylindrical flange 63, is a segment-shaped beam or bracket 116 having an arcuate outer flange 117 engaging the cylindrical flange 63 of the circular beam, and a rectilinear flange 118 rigidly connected to the arcuate flange as by a web 119 and stiffening flanges 120. Mounted on the rectilinear flange 118 for adjustment longitudinally thereof, as by a hook 121, is a horizontal pivot 122 supporting the cylinder 123 of a hydraulic jack for swinging movement in a vertical plane. Reciprocable in the cylinder 123 is a piston or plunger 124 provided at its free end with a rigid extension bar 125 having a reduced section 126, the purpose of which will be hereinafter described. At its free end, the bar 125 terminates in a convex hemispherical end portion 127. Pivotally attached to the gun girders 55, 56 for swinging movement in a vertical plane, as by pivots 128 are legs 130, 131 forming part of a U-shaped strongback 132. Rigidly connecting the legs of the strongback is a beam 133 provided with recessed blocks 134—136, one block 134 being disposed centrally of the beam and the other blocks 135, 136 being disposed in alignment with the legs 130, 131. In the example shown in full lines in Figure 4, the convex end 127 of the bar 125 is disposed in engagement with the central block 134, but by suitable adjustment of the hydraulic cylinder 123 along the segmental beam 116, the convex end 127 may be brought into engagement with either of the laterally offset blocks 135, 136. Connected to the hydraulic cylinder 123 is a flexible pipe 137 communicating with a rigid pipe 138 fixed to the circular girder 61 and provided with a flexible extension 139 between the circular girder and the base 11 of the testing frame. Inasmuch as the pipes 137, 139 are flexible, they do not interfere with vertical adjustment of the circular girder. The last-mentioned flexible pipe 139 is connected, as by a rigid pipe 140, to a hydraulic pump 141 provided with a hand lever 142 for producing any desired hydraulic pressure in the cylinder 123.

As shown in Figure 2, the pumps 91, 112, and 141 are mounted in spaced parallel relation on a control table 143 that is fixed to the floor adjacent the testing frame, as by angle irons 144 and bolts 145. Thus relative movement of various components tending to change the pressures in the hydraulic systems is prevented.

Any suitable means may be provided for measuring the loads applied, upon operation of the hand pumps 91, 112, and 141, through the hydraulic cylinders 86, 106, and 123. In the example shown, electric resistance strain gages 146—148 of the type described in U. S. Patent 2,292,549 granted to Simmons, Jr., are adhesively bonded to the reduced sections 74, 104, and 126 respectively, of the rods 72, 102, and 125 through which the loads are applied to the turret model. Disposed on the control table 143 adjacent the pumps 91, 112, and 141, respectively, are suitable meters 149—151 electrically connected, as by cables 152—154, with the respective gages 146—148. In the diagrammatic example shown in Figure 7, the electric resistance strain gage 146 comprises one leg of a Wheatstone bridge 155 energized by a source of direct current, such as a battery 156, and connected to the meter 149 in a conventional manner. Meters 150, 151 may be connected to bridge circuits similar to the bridge 155 for measuring changes in resistance of the strain gages 147, 148.

Means is also provided for measuring the strain on the turret model at any selected spots 157, 158. In the example shown in Figure 3, electric resistance strain gages 159, 160 are adhesively bonded to the selected spots and are connected, as by cables 161, 162 with suitable measuring circuits, (not shown), which may be similar to the Wheatstone bridge circuit 155 of Figure 7.

In Figures 1 and 6 is shown an independently standing frame 163 disposed in spaced adjacent relation to the loading frame 10 and rigidly supporting, as by bracket 164, a conventional Ames dial gage 165 having its contact finger 166 in engagement with any desired spot on the loading frame or model. Thus, any deflection of the testing frame or model, in the direction of the contact finger 166, produced for instance, upon the application of a load or a combination of loads to the turret model, will be indicated by the gage.

As shown in Figure 5, the top plate 19 of the testing frame base may, if desired, be provided with longitudinal, transverse, and circular delineations 167—169, respectively, scribed in its top surface. Also, circular series of screw-threaded openings 170 may be formed therein to facilitate the attachment of various sizes of models to the base.

In the use of the loading frame for testing turret models, the application of a downward load on the rotary carriage to represent the additional dead weight required for producing a condition of similitude between model and prototype, is accomplished by operation of the pump lever 92 shown in Figure 2. The resulting pressure in the hydraulic cylinder 86 acts downwardly on the rotary carriage through bearing 88, yoke 77, rod 72, and bearing 71. Inasmuch as the load is transmitted through the reduced section 74 of the rod, on which the electric wire resistance strain gage 146 is mounted, the magnitude of the downward force will be indicated by the deflection of the meter 149. By operating the pump lever 113, the application of a downward load on the barbette 57 to represent additional dead weight of armor is effected. The pressure in the hydraulic cylinder 106 acts downwardly on the vertical columns 94 carried by the barbette through bearing 109, rod 102, spider 97, and bearings 96. And since the electric resistance strain gage 147 is mounted on the reduced section 104 of the rod 102, the magnitude of the load transmitted therethrough will be indicated by deflection of the meter 150. By operating the pump lever 142, the application of a lateral or inclined load from any angle of train may be applied to the rotary carriage. By vertically adjusting the height of the circular girder 61, the angle of elevation at which the load is applied is varied, and by circumferentially adjusting the segment-shaped beam 116 with respect to the circular girder 61, the angle of train at which the load is applied may be varied through 360°. Additionally, the cylinder 123 of the hydraulic jack may be adjusted longitudinally of the segment-shaped beam 116 so that an unbalanced load may be applied to the strongback 132 through either of the blocks 135, 136. The pressure built up in the cylinder 123 of the jack will act on the strongback 132 through the rod 125. Thus the resistance of the strain gage 148 carried by the reduced section 126 of the rod will be varied, and the magnitude of the load transmitted through the rod will be indicated by the meter 151. The use of bearings in the loading mechanism permits non-uniform deflections of the turret model under loads applied from a plurality of directions. The strain gages 159, 160, in conjunction with suitable measuring circuits, serve to measure strains at selected points in the model.

Various changes may be made in the form of invention therein shown and described without departing from the spirit of the invention or the scope of the following claims.

The invention described herein may be manufactured and used by or for the Government of the United States of America for governmental purposes without the payment of any royalties thereon or therefor.

I claim:

1. In a model testing structure of the character described, a rigid base for supporting the model to be tested, vertical columns rigidly fixed to said base, horizontal members rigidly connected to the upper end portions of said columns and forming a polygonal frame, said base, columns and polygonal frame defining a three-dimensional testing space, means reacting against the vertical columns of said testing structure for applying a load having a horizontal component to said model from any one of a plurality of directions relative to the horizontal, means reacting against the polygonal frame for applying a vertical load to said model concurrently with application of said first-mentioned load, means for measuring the magnitude of said loads, and means for measuring strain produced in the model in at least one location by the concurrent application of said loads.

2. In a model testing structure of the character described, a rigid base for supporting the model to be tested, vertical columns rigidly fixed to said base, horizontal members rigidly connected to the upper end portions of said columns and forming a polygonal frame, said base, columns and members defining a three-dimensional testing space bounded by six sides, means for applying simultaneous loads to said model on said base within said space from locations on at least three different sides of said testing structure, means for separately measuring the magnitude of said loads, and means for measuring strain produced in the model in at least one location due to the combined effect of said loads.

3. In testing equipment of the character described, a rigid base for supporting a structure to be tested, vertical columns rigidly fixed to said base and defining a testing zone over the base, a circular beam having an inner circumferential surface capable of encircling the structure to be tested, means releasably securing the circular beam to said columns in any one of a plurality of vertically spaced horizontal positions above said base, means disposable in any one of a plurality of circumferentially spaced positions on the inner surface of said circular beam for applying a load to the structure to be tested from any one of a plurality of directions, and means for measuring the magnitude of said applied load.

4. In testing equipment of the character described, a rigid base for supporting a structure to be tested, vertical columns rigidly fixed to said base and defining a testing zone over the base, a circular beam having an inner circumferential surface capable of encircling the structure to be tested, means securing the circular beam to said columns in a horizontal position above said base, a segment-shaped beam having an arcuate outer surface for engagement with the inner circumferential surface of said circular beam and a flat surface, said segment-shaped beam being supported in any one of a plurality of circumferentially spaced positions on the inner surface of said circular beam, means disposed in any one of a plurality of positions relative to the flat surface of said segment-shaped beam for applying a load to the structure to be tested, and means for measuring the magnitude of said applied load.

5. In equipment for testing a turret model including a turret foundation, a rotary gun carriage on the foundation and a barbette; a rigid hollow base including a top plate for supporting the turret model on its foundation, said top plate having a central opening, vertical columns rigidly fixed to the base and defining a testing zone thereover, horizontal beams rigidly connected to said columns and forming a polygonal frame above the testing zone, means in the base for applying through said opening any one of a plurality of vertical loads on the rotary carriage to simulate the effect of various carriage deadweights, means reacting against said vertical columns for applying any one of a plurality of transverse loads to said rotary carriage to simulate the effect of gun recoil, means carried by said horizontal beams for applying any one of a plurality of vertical loads to the barbette to simulate various barbette weights, and means for measuring strain produced in the turret foundation in at least one location by the joint application of said vertical and transverse loads to the model.

6. In equipment for testing a turret model including a turret foundation, a rotary multiple gun carriage on the foundation, and a barbette; a rigid base for supporting the turret model on its foundation, means for applying a known vertical load to the rotary carriage, means for applying a known vertical load to the barbette, laterally shiftable means for applying a known transverse load to the gun carriage at any one of a plurality of gun positions thereon to simulate the recoil effect of firing any one or a plurality of said guns, and means for measuring strain produced in the turret foundation in at least one location by the joint application of said vertical and transverse loads to the model.

7. In equipment for testing a turret model including a turret foundation, a rotary gun carriage on the foundation, and a barbette; a rigid base for supporting the turret model on its foundation, means for applying a known vertical load to the carriage, means for applying a known vertical load to the barbette, vertically adjustable means for applying a known load to the carriage in any one of a plurality of directions at an angle with respect to the horizontal to simulate the effect of gun recoil at any one of a plurality of angles of elevation of a gun, and means for measuring strain produced in the turret foundation in at least one location by the joint application of said vertical and transverse loads to the model.

8. Equipment for testing a turret model of the type which includes a turret foundation, a rotary carriage on the foundation and a barbette; said equipment comprising a rigid base for supporting the turret model on its foundation, vertical columns rigidly fixed to the base and defining a testing zone thereover, horizontal members rigidly connected to the upper end portions of said columns and forming a polygonal frame, a beam fixed transversely of said frame above the testing zone, a spider including a central portion and a plurality of radially spaced portions, means reacting against said transverse beam for applying a downward load on said central portion, means for measuring the magnitude of said applied load, and means for transmitting downward loads from said radially spaced portions to the barbette.

9. Equipment as specified in claim 8, wherein said downward load transmitting means includes ball and socket articulating means to compensate for structural misalignments and inequalities in yielding of the barbette under said load.

EDWARD WENK, Jr.

REFERENCES CITED

The following references are of record in the file of this patent:

UNITED STATES PATENTS

| Number | Name | Date |
|---|---|---|
| 1,147,153 | Emery | July 20, 1915 |
| 2,058,444 | Harrison | Oct. 27, 1936 |
| 2,339,855 | Hodil et al. | Jan. 25, 1944 |
| 2,362,589 | Simmons, Jr. | Nov. 14, 1944 |
| 2,380,159 | Eksergian | July 10, 1945 |

FOREIGN PATENTS

| Number | Country | Date |
|---|---|---|
| 81,378 | Sweden | Sept. 4, 1934 |
| 562,078 | Germany | Oct. 21, 1932 |